United States Patent
Bennett (10) Patent No.: US 7,937,761 B1
(45) Date of Patent: May 3, 2011

(54) DIFFERENTIAL THREAT DETECTION PROCESSING

(75) Inventor: Jeremy Bennett, Mountain View, CA (US)

(73) Assignee: Symantec Corporation, Mountain View, CA (US)

(*) Notice: Subject to any disclaimer, the term of this patent is extended or adjusted under 35 U.S.C. 154(b) by 1121 days.

(21) Appl. No.: 11/016,535

(22) Filed: Dec. 17, 2004

(51) Int. Cl.
 *G06F 11/00* (2006.01)
 *H04L 29/06* (2006.01)

(52) U.S. Cl. .............. 726/23; 726/22; 726/24; 726/25; 713/153; 713/154

(58) Field of Classification Search .............. 370/234, 370/464; 709/224; 713/153–154; 726/11–13, 726/22–25
See application file for complete search history.

(56) References Cited

U.S. PATENT DOCUMENTS

| | | | | |
|---|---|---|---|---|
| 5,606,668 A * | 2/1997 | Shwed | ............................ | 726/13 |
| 5,991,881 A * | 11/1999 | Conklin et al. | ................. | 726/22 |
| 6,499,107 B1 * | 12/2002 | Gleichauf et al. | ............. | 726/23 |
| 6,519,703 B1 * | 2/2003 | Joyce | ............................. | 726/22 |
| 6,789,116 B1 * | 9/2004 | Sarkissian et al. | ............ | 709/224 |
| 7,007,101 B1 * | 2/2006 | Schwaderer | ................... | 709/238 |
| 7,046,680 B1 * | 5/2006 | McDysan et al. | ............ | 370/396 |
| 7,331,061 B1 * | 2/2008 | Ramsey et al. | ................. | 726/23 |
| 7,562,389 B1 * | 7/2009 | Goyal et al. | .................... | 726/22 |
| 2002/0083331 A1 * | 6/2002 | Krumel | ........................ | 713/200 |
| 2002/0144156 A1 * | 10/2002 | Copeland, III | ............... | 713/201 |
| 2003/0088791 A1 * | 5/2003 | Porras et al. | ................. | 713/201 |
| 2003/0145231 A1 * | 7/2003 | Poletto et al. | ................. | 713/201 |
| 2003/0177381 A1 * | 9/2003 | Ofek et al. | .................... | 713/200 |
| 2004/0083295 A1 * | 4/2004 | Amara et al. | ................. | 709/229 |
| 2005/0193429 A1 * | 9/2005 | Demopoulos et al. | ......... | 726/23 |
| 2006/0253903 A1 * | 11/2006 | Krumel | .......................... | 726/13 |

OTHER PUBLICATIONS

Cisco Systems, White Paper, Network Admission Control, http://www.cisco.com/en/US/netsol/ns466/networking_solutions_white_paper0900aecd800fdd66.shtml.

* cited by examiner

*Primary Examiner* — Hosuk Song
*Assistant Examiner* — Darren B Schwartz
(74) *Attorney, Agent, or Firm* — Hunton & Williams LLP (57) ABSTRACT

Detecting a network security threat is disclosed. Network traffic is classified with a security risk related classification, the classification being determined at least in part by applying a threat detection heuristic to at least a portion of the network traffic. Classification data that indicates the security risk related classification into which the network traffic has been classified is added to the network traffic. The network traffic is subjected to a level of network security threat detection processing that corresponds to the security risk related classification into which the network traffic has been classified as determined based at least in part on the classification data.

9 Claims, 11 Drawing Sheets

DIFFERENTIAL THREAT DETECTION PROCESSING

FIELD OF THE INVENTION

The present invention relates generally to network security. More specifically, differential threat detection processing is disclosed.

BACKGROUND OF THE INVENTION

Maintaining network security is often a difficult balance of scrutinizing network traffic for threats while still sustaining network performance. In an effort to scrutinize network traffic as thoroughly as possible, larger and more powerful systems have been used to perform network threat detection processing. Unfortunately, network speeds are increasing at a rate faster than the processing capability required to completely analyze them. Today a high-end network Intrusion Detection System (IDS) can examine approximately 20% of a one-gigabit network link. Experts in the industry expect network security systems to be able to process only 4-10% of network traffic as ten-gigabit network links become the norm if current detection methods continue to be used.

A typical IDS is configured to apply the same threat detection processing to the network traffic the IDS is configured to analyze, typically ignoring certain kinds of traffic and applying the same preconfigured processing to the rest. The level of sensitivity typically is determined based on such factors as the value and importance of the network asset(s) being protected; the threat environment; the tolerance of the user or other stakeholders for the impact of threat detection processing on performance (e.g., latency, etc.); etc. In some cases, network resources have been divided into physically separate sub-networks, with more thorough threat detection processing being performed with respect to resources associated with one sub-network than the other, e.g., by segregating certain resources into a "high security" network. Typically, however, all traffic associated with a particular network or sub-network receives the same processing, with some traffic being passed without inspection and the remainder being subjected to the same processing. In such typical installations, depending on the degree of sensitivity, etc. to which threat detection systems and/or processes are tuned, innocuous traffic may be delayed unduly, e.g., while potentially traffic in line ahead of it is scrutinized, potentially\ harmful traffic may be delayed unduly in being processed and/or allowed to pass without scrutiny (or sufficiently careful scrutiny), and/or network security administrators and/or other users may be inundated with more threat reports (e.g., alerts) than they can meaningfully process. Therefore, there is a need for an effective way to maximize the threat detection processing performed with respect to potentially harmful network traffic without delaying unduly the processing of benign network traffic, including by allowing different traffic associated with the same network resource to be processed differently.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Differential network threat detection processing is disclosed. In one embodiment, network traffic is classified with a security related classification. The network traffic is then routed through different physical and/or logical paths according to the obtained classification. In one embodiment, differential network threat detection processing is performed on the network traffic based at least in part on the physical and/or logical path through which the network traffic is routed.

Figure 1:
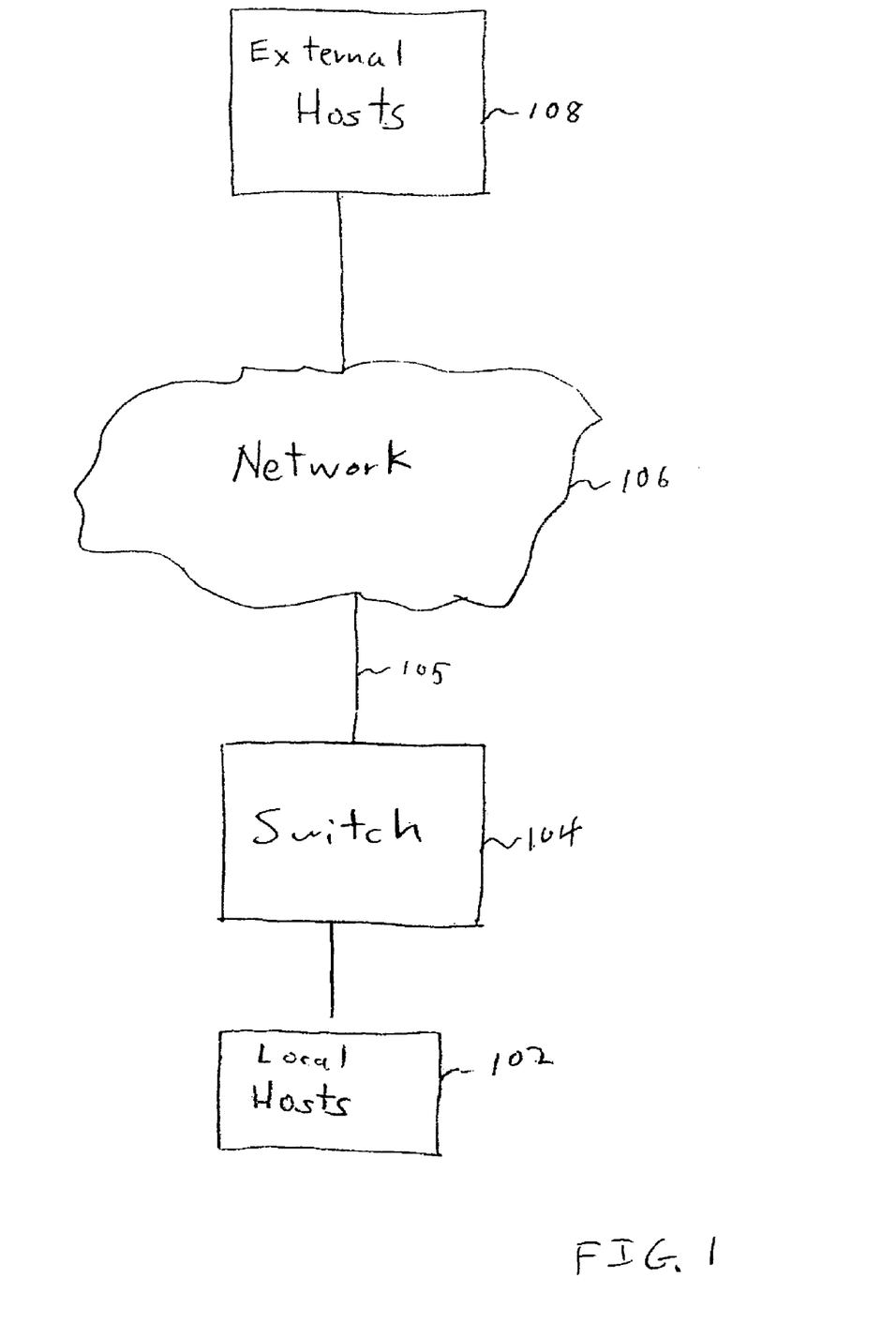
FIG. 1 illustrates a typical network environment.

FIG. 1 illustrates a typical network environment. In this example, local hosts (102) are connected by a switch (104) to a network (106), which connects external hosts (108). In one embodiment, network (106) is the Internet. In other embodiments host (102) may be connected by a switch (104) via any public or private network and/or combination thereof, including without limitation the Internet, intranet, LAN, WAN, and other forms of connecting multiple systems and or groups of systems together. The example of the network has been simplified to illustrate the embodiment clearly. Other network components such as firewalls, routers, or any other network-switching device could exist in addition or as a replacement to the switch component (104). Monitoring network traffic for security threats involves examining data traffic passing between hosts. In one embodiment, network traffic between the local hosts (102) and external hosts (108) via the network (106) is monitored for security threats. In one embodiment, such monitoring is performed by a device, system, and/or process configured to monitored traffic sent on the connection (105) between the network (106) and the switch (104). In one embodiment, the monitoring is performed by switch (104) and/or a similar component in the path between the local hosts (102) and the network (106).

Figure 2:
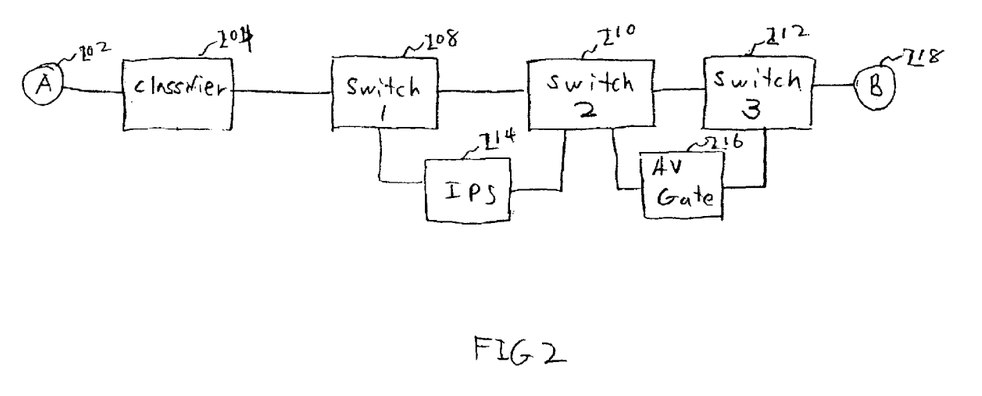
FIG. 2 is a diagram illustrating differential threat detection processing as implemented in one embodiment.

FIG. 2 is a diagram illustrating differential threat detection processing as implemented in one embodiment. In one embodiment, the network environment could include any number of switches, security devices, and/or any network device. In one embodiment, low-risk traffic is allowed to traverse the network quickly while higher risk traffic is fully inspected more fully, such that only high-risk traffic is delayed by more thorough threat detection processing. In the example shown, inbound network traffic received at network node A (202) is associated with one or more destinations (e.g., hosts) associated with network node B (218). A classifier (204) scans traffic received at A (202) using one or more heuristics and tags the data traffic according to the dynamically assessed level of risk. In one embodiment, known heuristics are used to determine quickly whether particular traffic warrants further analysis. In one embodiment, the heuristics used to classify traffic include one or more techniques well known to those of skill in the art for determining quickly whether traffic is suspicious and/or may present a threat, such that further analysis is warranted, including without limitation protocol or other anomaly detection and detection of unusual traffic patterns (e.g., with respect to a particular destination port and/or protocol). In one embodiment, some traffic may be selected randomly to receive more full analysis. In one embodiment, the classification process may be influenced by external information provided to classifier (204), e.g., information concerning the network threat environment generally, suspicious activity on the network relate to a particular protocol, user, port, etc., or any other external information that may be of use in quickly classifying traffic based on the level of risk posed by the traffic. In one embodiment, traffic is classified as either low or high risk. In other embodiments, traffic is classified into more than two levels. In one embodiment, the heuristic(s) applied by the classifier (204) are such that traffic can be classified quickly, if not necessarily always accurately, with more complete analysis being completed based on the classification. In one embodiment, the classification involves an analysis of at least a portion of the content of each set of data traffic to determine whether that particular set of data traffic is suspicious and, in some embodiments, the level of suspicion and or degree of threat. In one embodiment, some data traffic can pass through the classifier (204) without obtaining a security classification in order to speed up the classification process. In one embodiment, data that does not receive a security classification is subjected to default processing. In one alternative embodiment, the default processing comprises the highest (most thorough) level of threat detection processing. In one embodiment, no further threat detection processing is performed on traffic to which a security classification is not assigned. After data traffic passes through the classifier (204), in the example shown switches 1-3 (208, 210, 212) route traffic on different physical paths according to the classification received at the classifier (204). In one embodiment, if switch 1 (208) receives traffic marked as a high security threat, it is passed on to the Intrusion Prevention System ("IPS") (214) for further analysis. Likewise, if switch 2 (210) receives traffic marked as a high security threat, it is passed on to the Anti-Virus Gate (216) for further analysis. However if the traffic had been marked as a low security threat, switch 1 (208) and switch 2 (210) would have directly routed the traffic on to the next switch, bypassing further security analysis.

In one embodiment, classifier (204) is configured to classify traffic as "low", "medium", or "high" risk. In one such embodiment, an additional IPS, not shown in FIG. 2, is provided and configured to apply to traffic routed to it a medium level of security analysis. For example, the IPS (214) may be configured to perform full packet analysis on each packet received, whereas the medium level IPS may be configured to perform a quick scan that requires less processing than the full packet analysis performed by the high security IPS (214). In one such embodiment, switch (208) is configured to route traffic classified as "high risk" to IPS (214) and to route traffic classified as "medium risk" to the above-described medium risk IPS. In one alternative embodiment, only one IPS (e.g., 214) is provided, and the IPS is configured to distinguish between high and medium risk traffic and apply the appropriate threat detection processing. In one such embodiment, switch (210) is configured to route traffic classified as "medium" risk to switch (212) and traffic classified as "high" risk to AV gate (216), e.g., based on a tag or other indication of how a received set of data traffic was classified and/or the port on which the set was received.

In one embodiment, either classifier (204) or switch (208) is configured to use encapsulation and/or other techniques to add a VLAN or virtual circuit type tag to each set of data traffic, the value of the tag correspond to the classification assigned to the set of data traffic, and one or more subsequent components use the tag to determine how to route and/or process each set of data traffic. In one embodiment, traffic is tagged, routed, and/or processed based on the port on which it was received. For example, in one embodiment classifier (204) sorts traffic into high and low risk and sends high risk traffic to a first port of switch (208) and low risk traffic to a second port. In one such embodiment, switch (208) is configured to tag the data traffic based on the port on which it was received. In one embodiment, switch (208) is configured to route traffic based on the port on which it was received from classifier (204).

The number of levels into which traffic may be classified and the type of threat detection processing performed and security components used as described in the examples discussed in detail herein are merely illustrative examples. The number of classification levels and/or the type of processing applied to data traffic under each classification may vary and typically will depend on the needs and preferences of stakeholders associated with the network and/or network elements being protected.

In one embodiment, the throughput gain of low security risk data bypassing one or more of the security systems and/or being subjected to less intensive threat detection processing by one or more of them is greater than the overhead of classifying and routing data according to the classification, with the result that the effective throughput of the network is greater than having all data traffic pass through the IPS (214) and the AV Gate (216). Moreover, since only a subset of data traffic is route to them the IPS (214) and the AV Gate (216) can be configured to perform more thorough threat detection processing on traffic routed to them. This means a reduction in false positive and negative results, generating more reliable and usable results for security administrators, systems, and/or processes and allowing more complete handling of identified threats. The result is a more efficient network without sacrificing security with respect to the most serious network-borne threats.

Figure 3A:
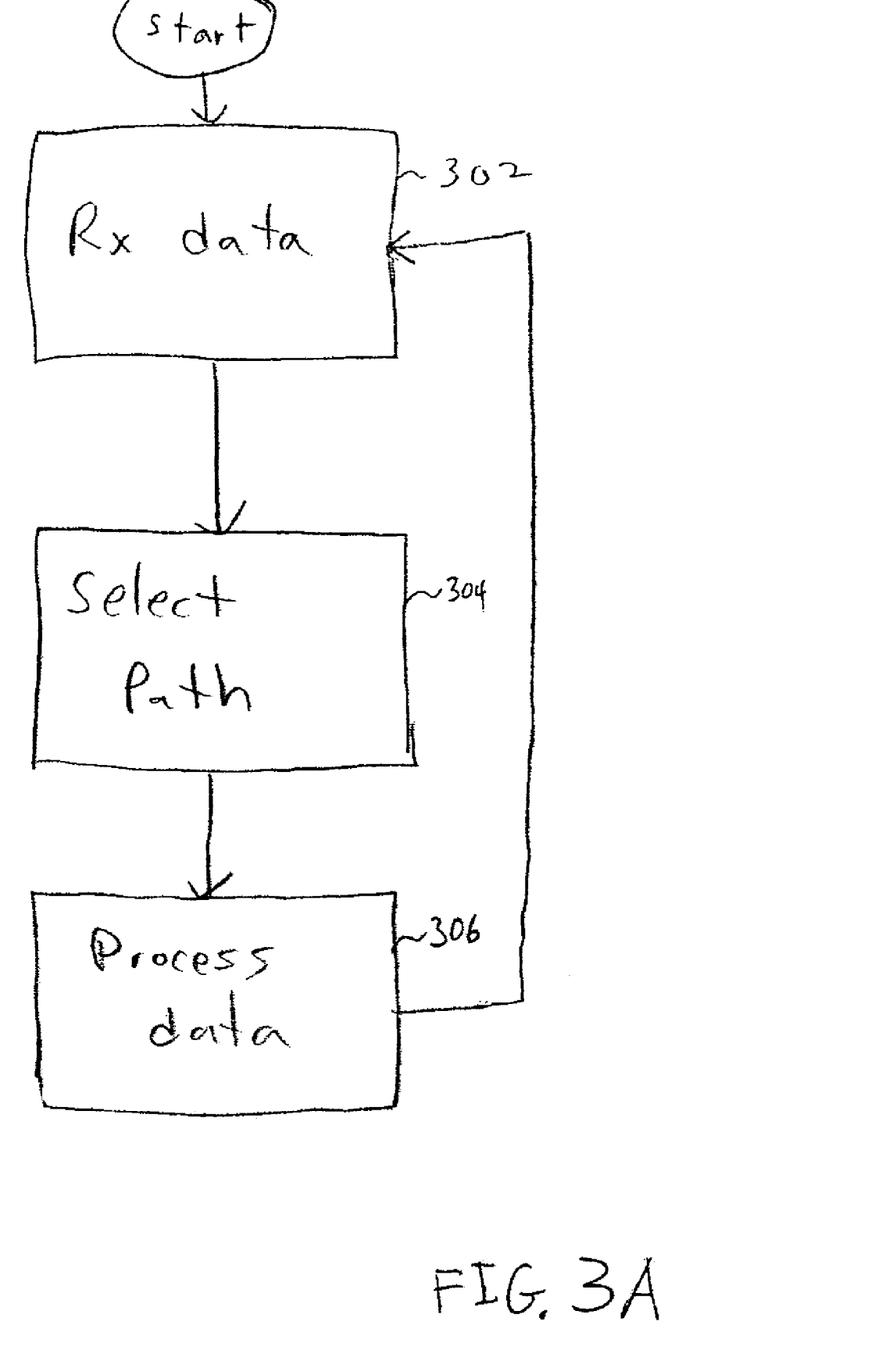
FIG. 3A is a flowchart of a process used in one embodiment to implement security-based traffic routing.

FIG. 3A is a flowchart of a process used in one embodiment to implement security-based traffic routing. Network data traffic is received in 302. The received network data traffic is analyzed in 304 to determine the associated security path the traffic should take through a network security processing portion of the network. In 306, the data traffic is further processed according to the previously determined security classification in 304. After processing, these steps are repeated with respect to each set of network data traffic received at 302.

Figure 3B:
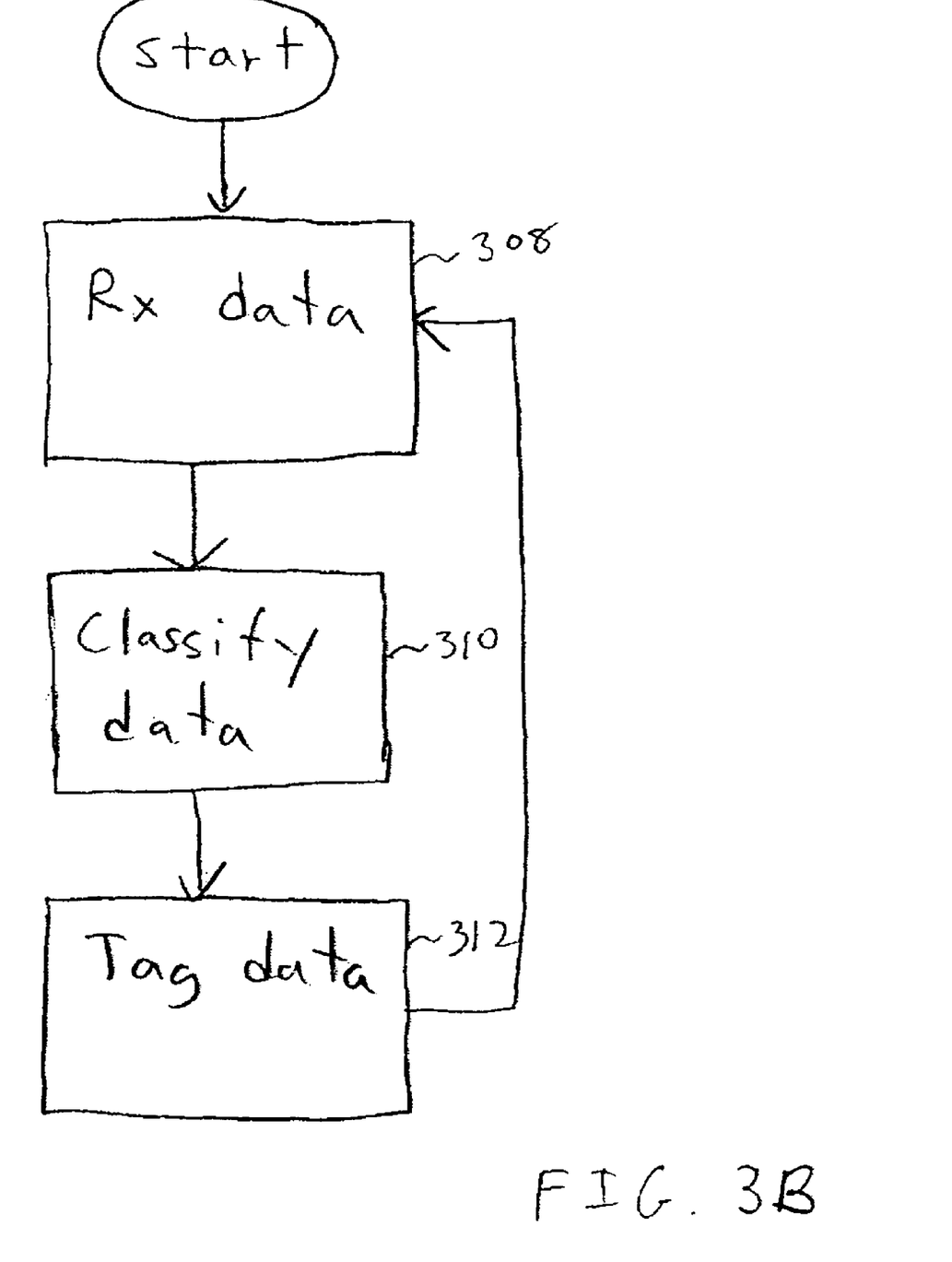
FIG. 3B is a flowchart of a process used in one embodiment to classify and tag data traffic according to the associated security threat levels.

FIG. 3B is a flowchart of a process used in one embodiment to classify and tag data traffic according to the associated security threat levels. In one embodiment, the process of FIG. 3B is implemented on a classifier component such as the classifier (204) of FIG. 2 and/or imbedded inside a switch, firewall, router, and/or any other network device configured to observe traffic between two or more hosts. Network data traffic is received in 308. The received network data traffic is analyzed in 310 to determine the security threat level of the data traffic. In one embodiment, a quick analysis is performed on the data traffic to determine the security risk classification of the data traffic. In one embodiment, an input is received from one or a group of modules regarding the security risk classification of the data traffic. In 312, the classified data traffic is tagged with an identifier used by other modules to quickly identify the security classification of the data traffic. In one embodiment, the security threat classification is recorded in the traffic routing information. In one embodiment, the security threat classification is recorded in the IP header information for data traffic. In one embodiment, the security threat classification is tagged on the data traffic using VLAN tags. In one embodiment, the security threat classification is labeled on the data traffic using MPLS labels. In one embodiment, the security threat classification is recorded in a separate data location from the data traffic. In one embodiment, only a portion of the data traffic is tagged. After tagging, these steps are repeated with each new set of network data traffic received at 308.

Figure 3C:
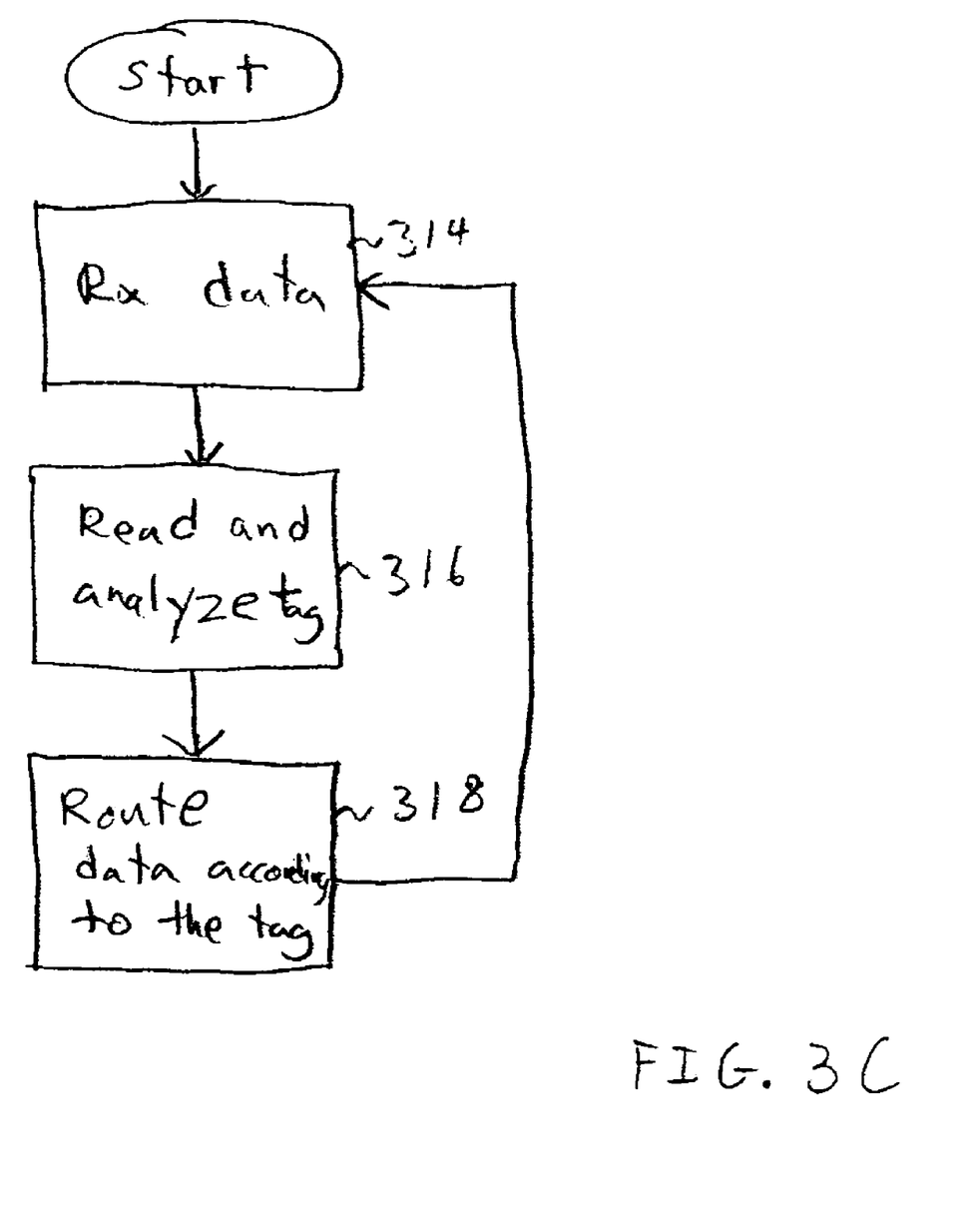
FIG. 3C is a flowchart of a process used in one embodiment to recognize and route data traffic according to the associated security threat levels.

FIG. 3C is a flowchart of a process used in one embodiment to recognize and route data traffic according to the associated security threat levels. In one embodiment, the process of FIG. 3C is implemented on a switch (such as the switches 208, 210, 212 in FIG. 2), router, and/or any other network device configured to route traffic between two or more devices. Network data traffic is received in 314. The security threat classification tag associated with the received data traffic is read and analyzed in 316. After the tag has been analyzed, the data traffic is routed in 318 according to the path associated with the tag. In one embodiment, the path associated with the tag is preconfigured. In one embodiment, the path associated with the tag is configurable. In one embodiment, the path associated with the tag is dynamic and may change over time, e.g., depending on network threat conditions, etc. Steps 314-318 are repeated with respect to each new set of network data traffic received at 314.

Figure 4A:
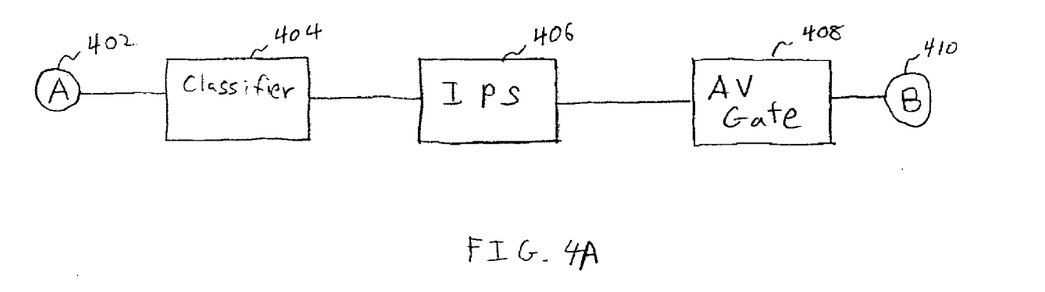
FIG. 4A is a diagram illustrating one embodiment of classification-aware network security devices used in a network environment.

FIG. 4A is a diagram illustrating one embodiment of classification-aware network security devices used in a network environment. Network nodes A (402) and B (410) represent logical data receive and exit points much like network nodes A (202) and B (218) of FIG. 2. Unlike the aforementioned embodiment of FIG. 2, there exists only one physical path from node A (402) to node B (410) in FIG. 4A. In the example shown, classified traffic is routed on different logical paths rather than physical paths. The classifier (404) classifies network data traffic according to security threat level much like the classifier (204) of FIG. 2. However, the IPS (406) and the AV Gate (405) are now aware of the different security classifications. Consequently each security device will internally handle data traffic on different logical paths according to the security tag placed by the classifier (404). In one embodiment, the network environment could include any number of security devices and/or any network devices. In one embodiment, the classifier, IPS, AV Gate, and/or any network devices are embedded together in one network security device.

Figure 4B:
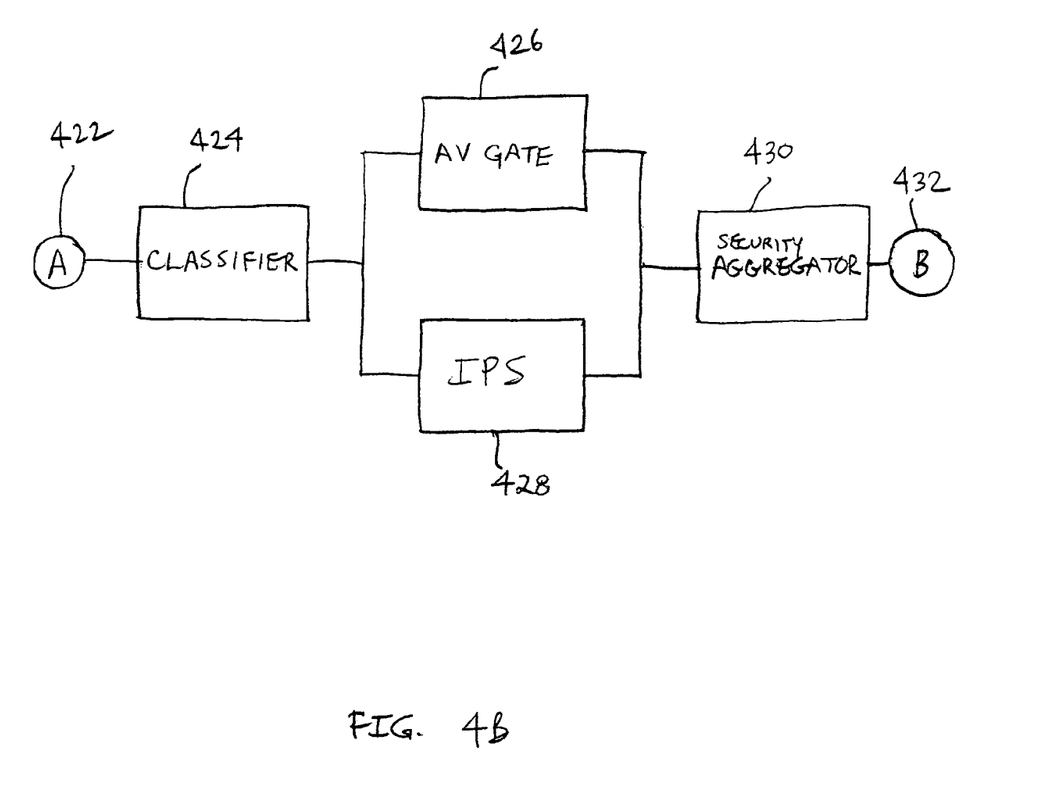
FIG. 4B is a diagram illustrating one embodiment of classification-aware network security devices used in a network environment.

FIG. 4B is a diagram illustrating one embodiment of classification-aware network security devices used in a network environment. Network nodes A (422) and B (432) represent logical data receive and exit points. In this example, data being sent from node A to node B is classified by a classifier (424) and sent down multiple, parallel paths, each of which has one or more inline security devices and/or processes. In the example shown, the data (e.g., each packet) is tagged with a classification by classifier (424) and sent down a first path including AV Gate (426) and a second path including IPS (428). On each path, the packet is processed based at least in part on the security classification assigned to it by classifier (424) as indicated by the tag appended to the packet by classifier (424). If the packet fails a security check applicable to and performed on it along any of the paths along which it has been sent, in one embodiment the device and/or process performing the check blocks (or drops) the packet and does not forward it. Each of the parallel paths leads to a security aggregator (430). In one embodiment, the security aggregator (430) is configured to forward a packet on to node B (432) only if the packet is received at security aggregator (430) along all (or a prescribed minimum number, subset, and/or combination of) the parallel paths (i.e., no security device and/or process blocked or dropped the packet or otherwise caused it not to be forwarded on to the security aggregator (430). While two parallel paths are shown in FIG. 4B, any number of paths and/or inline security devices and/or processes may be used.

Figure 5:
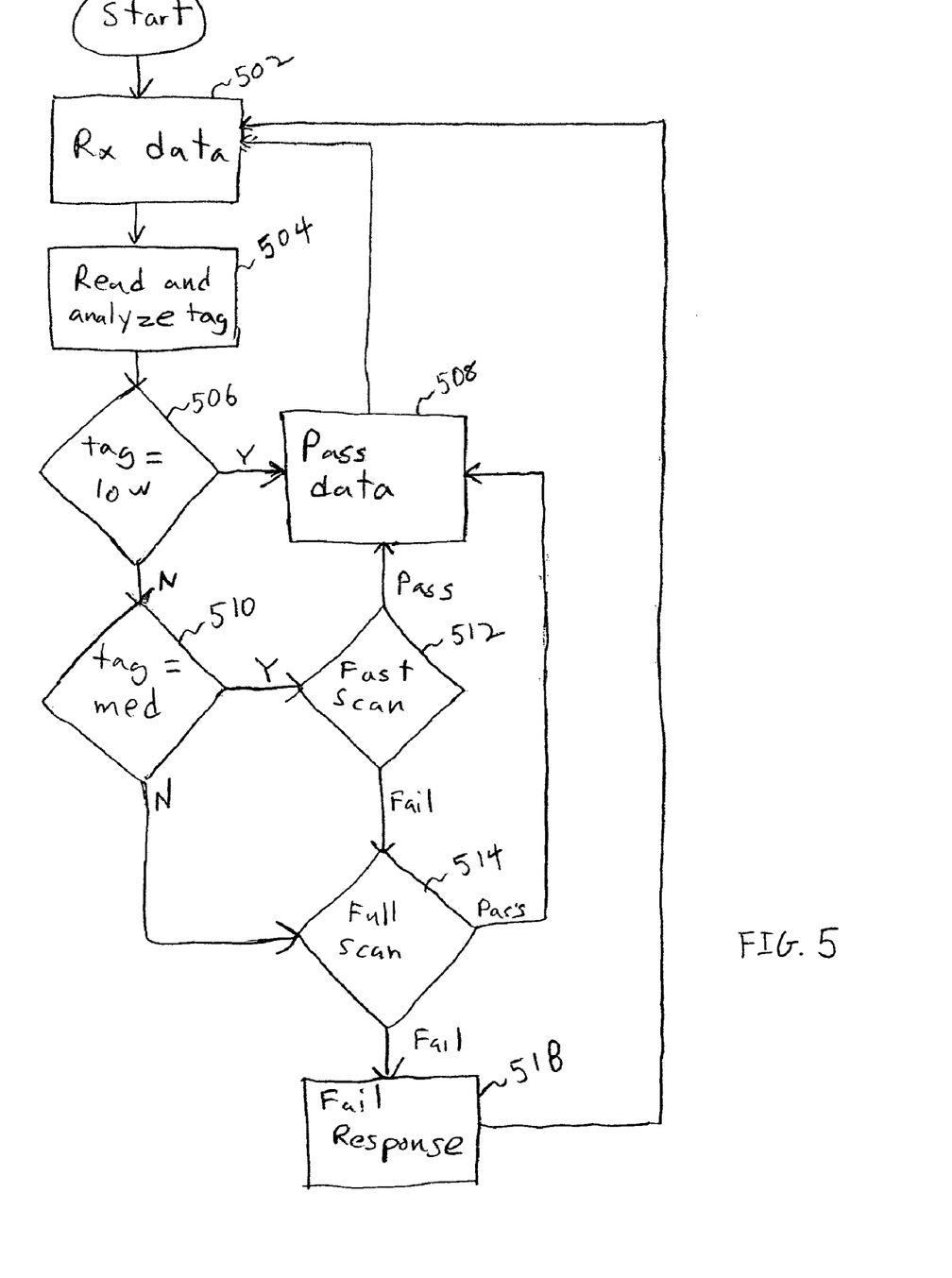
FIG. 5 is a flowchart of a process used in one embodiment to perform classification-aware threat detection processing.

FIG. 5 is a flowchart of a process used in one embodiment to perform classification-aware threat detection processing. In one embodiment, the process of FIG. 5 is implemented on an IPS, AV Gate, firewall, intrusion detection system, and/or some other network security device. In one embodiment, the process of FIG. 5 is implemented on an IPS and AV Gate, such as the IPS (406) and AV Gate (408) of FIG. 4. Network data traffic is received in 502. A security threat classification tag associated with the received data traffic is read and analyzed in 504. In the example shown, there are three security threat classifications: high, medium, and low. In other embodiments, more or fewer classification levels are used. If the tag corresponds to low security threat classification in 506, in 508 the data traffic is routed as normal to the next network device without any additional analysis or processing. Otherwise if the tag corresponds to a medium security threat classification in 510, a fast security threat scan is performed on the received data traffic in 512. In one embodiment, the fast scan analyzes selective portions of all passing data traffic and/or fully scans a selective number of the passing data traffic. If no threat has been detected, the data traffic is routed to the next network device as usual in 508. However, if the received data traffic fails the fast scan, or if it is determined in 510 that the tag does not correspond to a medium security threat classification (as would occur, e.g., if the tag corresponded to a high security threat classification and/or no tag was present), the data traffic is passed on to a more thorough full scan at 514. Passing the full scan in 514 will allow the data traffic to be routed to the next device in 508, but failing the scan will trigger a security fail response in 518. In one embodiment, the fail response depends upon the result of the full scan. In one embodiment the fail response includes retagging the data traffic. In one embodiment the fail response includes sending an alert. In one embodiment, the fail response includes blocking the data. In one embodiment, the fail response includes storing data and/or information associated therewith. In one embodiment, the fail response includes performing further analysis. In one embodiment, the fail response includes isolating one or more systems believed to have caused the security threat. In one embodiment, the fail response includes isolating a network or portion thereof believed to have caused the security threat. In one embodiment, the fail response includes sending the data traffic to another network device. In one embodiment, the fail response includes changing and/or updating one or more criteria used to classify received data traffic. Although the example shown describes a real-time detection method, in one embodiment the approaches described herein may be used to analyze historical traffic data to efficiently search for network security threats. In one such embodiment, the data received in 502 comprises historical data. The process of FIG. 5 repeats for each set of data traffic that is received.

Figure 6:
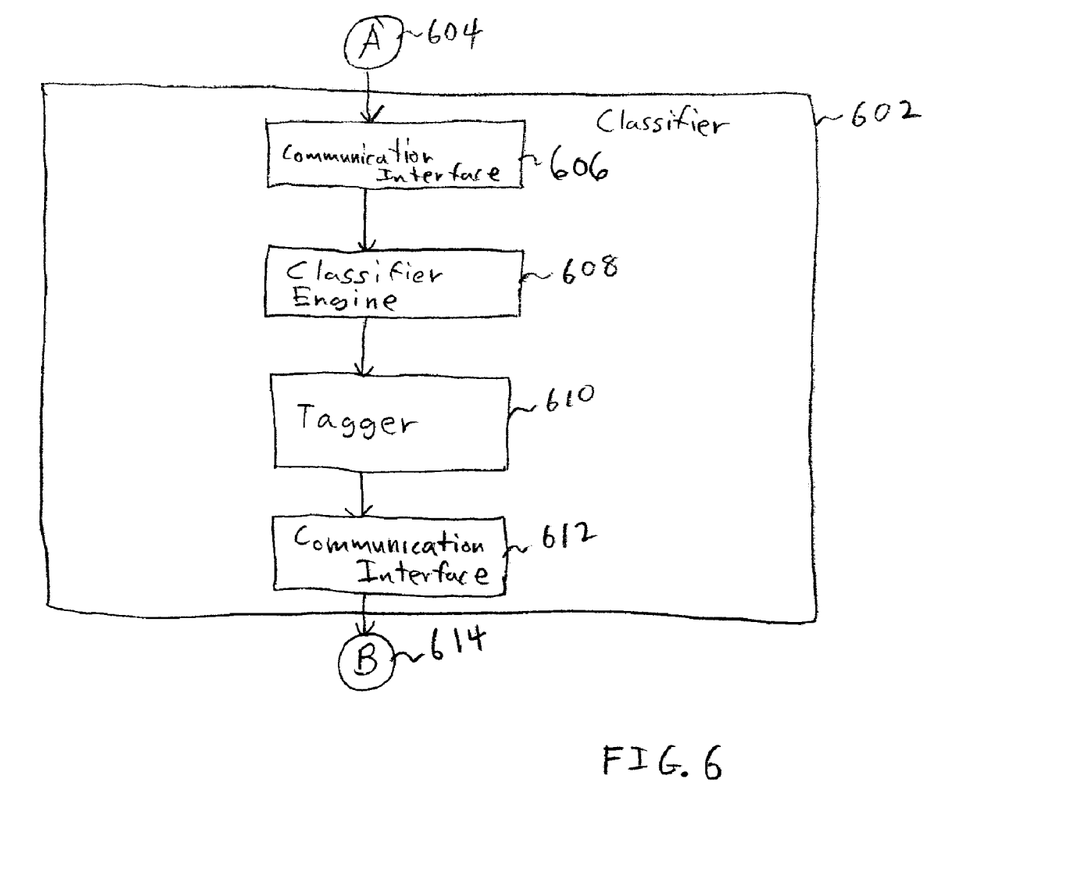
FIG. 6 is a diagram illustrating one embodiment of a system used to classify and tag network data traffic corresponding to the security threat level of the data traffic.

FIG. 6 is a diagram illustrating one embodiment of a system used to classify and tag network data traffic corresponding to the security threat level of the data traffic. The classifier (602) is connected to network node A (604) at which inbound network data traffic is received and node B (614) to which inbound network data traffic is forwarded by communication interfaces (606) and (612) respectively. Received data traffic is provided to a classifier engine (608), which in one embodiment performs an initial analysis of the received network data traffic and assigns a security risk classification to each received set of network data traffic based at least in part on the analysis. In one embodiment, classifier engine (608) implements 310 of FIG. 3B. Classifier engine (608) provides each successive set of received data traffic and its assigned security risk classification to a tagger (610), which appends to each set of data traffic a tag corresponding to the security risk classification assigned to the set of data traffic by classifier engine (608). In one embodiment, tagger (610) implements 312 of FIG. 3B. In one embodiment, the classifying and tagging operations of the classifier are included in one or more other network systems such as a switch, firewall, router, IPS, AV Gateway, network security device and/or any network devices. In one embodiment, the classifier (602) performs just classifies each set of data traffic and one or more other components tag each data set. In one embodiment, classifier engine (608) and/or tagger (610) are implemented using one or more general use and/or application specific processors configured to perform the operations described herein.

Figure 7:
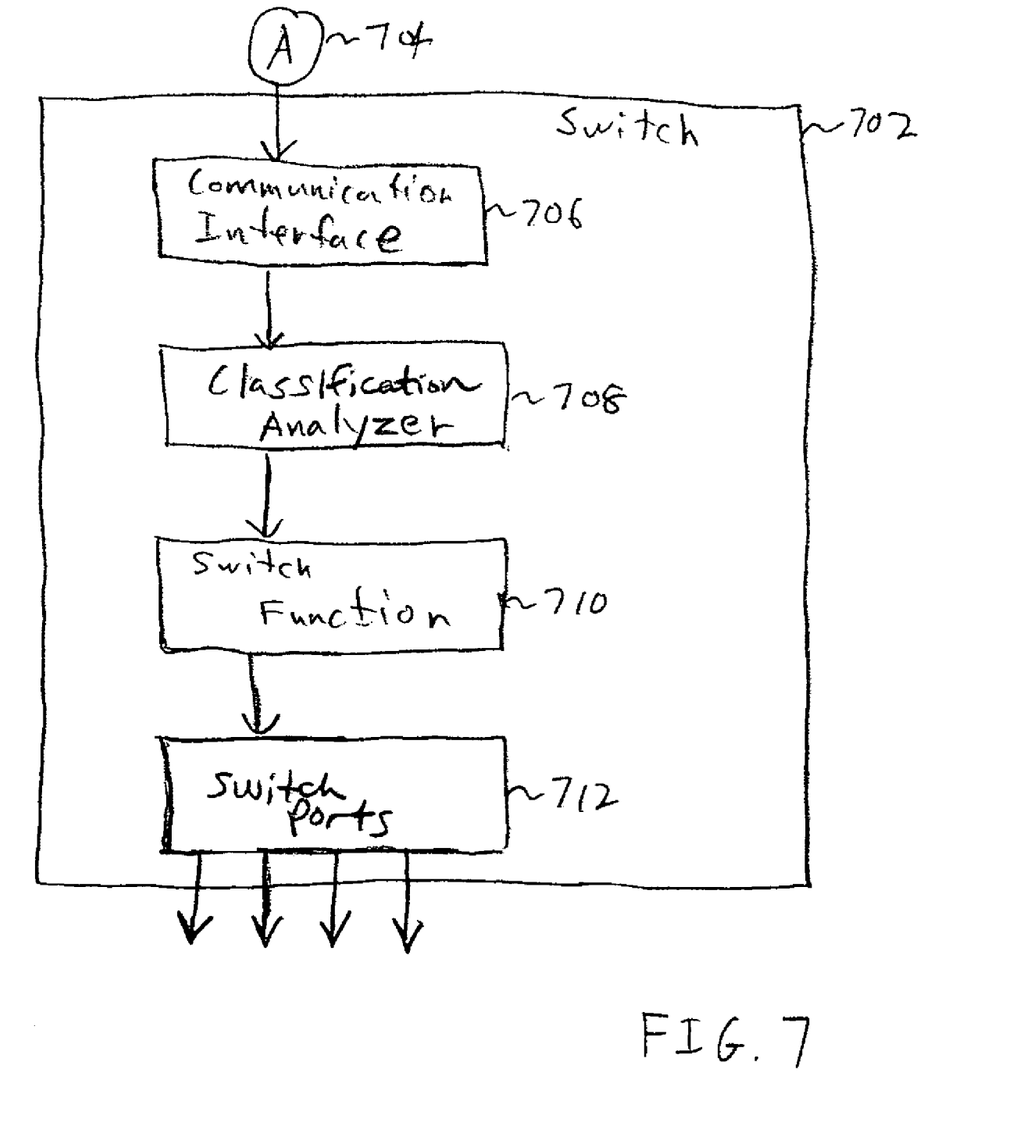
FIG. 7 is a diagram illustrating one embodiment of a system used to route data traffic based on the security threat level of the data traffic.

FIG. 7 is a diagram illustrating one embodiment of a system used to route data traffic based on the security threat level of the data traffic. The switch (702) is connected to network node A (704), at which inbound network data traffic is received, by a communication interface (706). In one embodiment, communication interface (706) comprises a network uplink. Inbound network data traffic received via communication interface (706) is provided to a classification analyzer (708). In one embodiment, the classification analyzer (708) reads a tag and/or other data associated with each set of received data traffic and determines from the value and/or presence of the tag or other data a classification assigned previously to the set of data. In one embodiment, classification analyzer (708) implements 316 of FIG. 3C. Classification analyzer (708) provides each successive data set and its associated classification to a switch function (710). In one embodiment, switch function (710) routes each set of data to a selected one of a plurality of switch ports (712) based at least in part on the classification determined by classification analyzer (708). In one embodiment, each of the plurality of switch ports (712) is associated with a different physical path, each path being associated with a different type and/or degree of threat detection processing. In one embodiment, switch function (710) implements 318 of FIG. 3B. As shown in the example, the system comprises a switch (702), but in other embodiments, the component performing the security-class-aware routing could be any component connected to a network, including without limitation a router, firewall, or intrusion detection or other security systems. In one embodiment, classification analyzer (708) and/or switch function (710) are implemented using one or more general and/or application specific processors.

Figure 8:
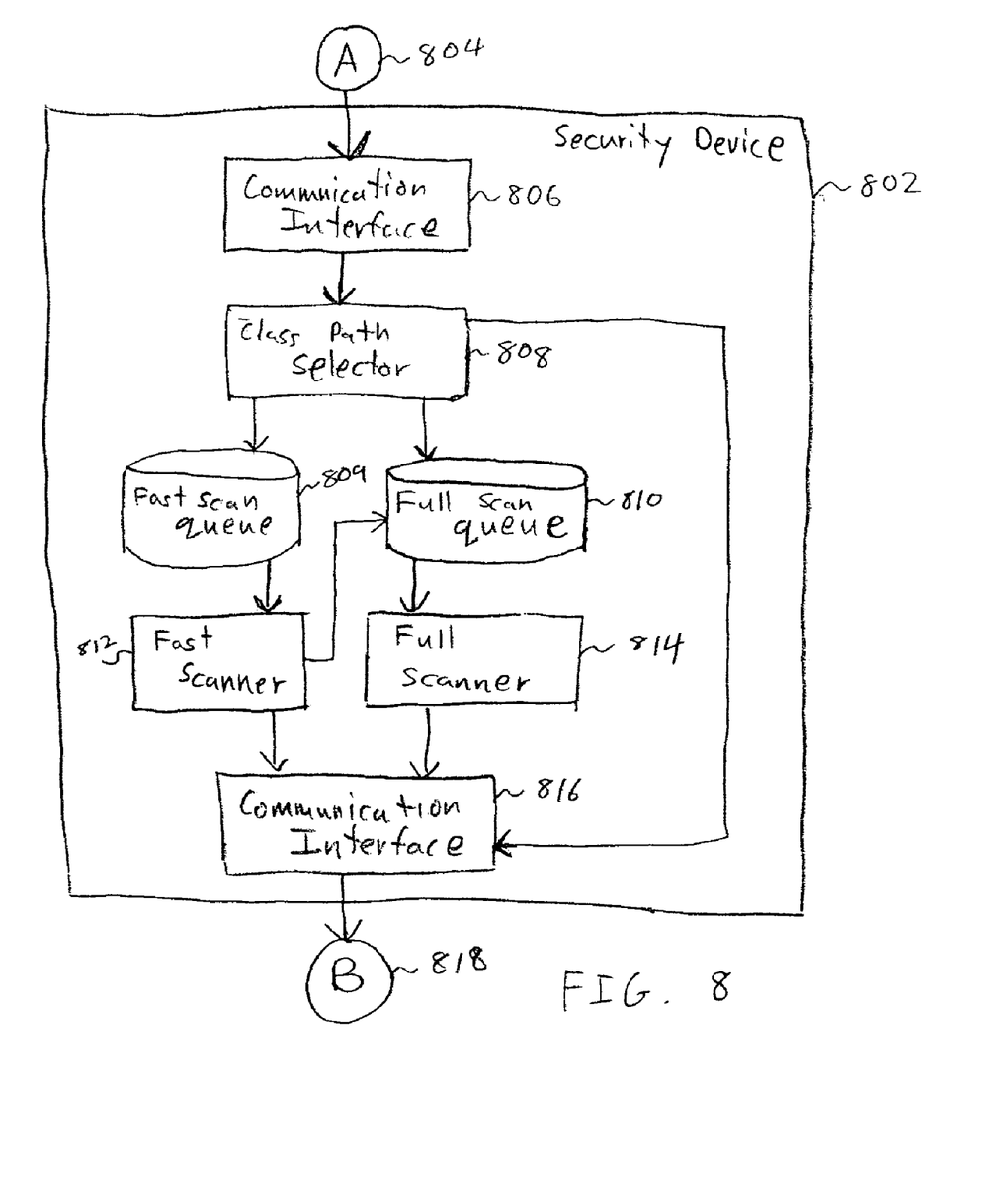
FIG. 8 is a diagram illustrating one embodiment of a security-class-aware network security system.

FIG. 8 is a diagram illustrating one embodiment of a security-class-aware network security system. The security device (802) is connected to network node A (804) at which inbound network data traffic is received and node B (818) to which data is provided after processing by device (802) by communication interfaces (806) and (816), respectively. Data traffic received by the communication interface (806) is passed on to the class path selector (808), which reads and analyzes the security threat classification tag. In one embodiment, class path selector (808) implements 504 of FIG. 5. In the example shown, queues (809, 810) have been put in place before the scanners (812, 814) to temporarily store data traffic while previously received data traffic is being analyzed. Depending upon the security classification level, the data traffic can be passed directly on to network node B (818) through the communication interface (816), placed in the fast scan queue (809), or placed in the full scan queue (810). In one embodiment, one queue is used to store both data traffic destined for the fast scanner and the full scanner. In the example shown, data traffic in the fast scan queue (809) will be analyzed by the fast scanner (812). In one embodiment, fast scanner (812) implements 512 of FIG. 5. In the example shown, data traffic in the full scan queue (810) will be analyzed by the full scanner (814). In one embodiment, full scanner (814) implements 514 of FIG. 5. Any data traffic failing the fast scanner will get placed in the full scan queue for further analysis, while any data traffic failing the full scanner will be processed as described above in connection with 518 of FIG. 5. In one embodiment, device (802) includes an administrative interface (not shown in FIG. 5) used to send alerts and/or other data, receive updates to definitions, signatures, and the like used by fast scanner (812) and/or full scanner (814), receive administrative information and/or commands, etc. Data traffic that passes the threat detection processing performed either by fast scanner (812) or full scanner (814) is delivered to output network node B (818) through the communication interface (816).

The components shown in FIGS. 6, 7, and 8 and described above may be implemented in any suitable way, such as one or more integrate circuits and/or other devices, or as firmware, software, or otherwise.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting a network security threat, comprising:

classifying network traffic with a security risk related classification, the classification being determined at least in part by applying a threat detection heuristic to at least a portion of the network traffic;

tagging the network traffic with classification data that indicates the security risk related classification into which the network traffic has been classified;

sending the tagged network traffic, including the classification data, down each of a plurality of parallel paths, each path having associated with it one or more inline security measures configured to apply to the tagged network traffic one or more types of network security threat detection processing to an extent determined based at least in part on the classification data, wherein the same tagged network traffic is sent down each of the plurality of parallel paths;

processing the tagged network traffic sent down each of the plurality of parallel paths according to the respective one or more inline security measures based at least in part on the classification data, wherein processing the tagged network traffic sent down each of the plurality of parallel paths comprises dropping the tagged network traffic if the tagged network traffic fails a security check and forwarding the tagged network traffic if the tagged network traffic passes the security check;

determining whether the forwarded network traffic was received from a minimum number of the plurality of parallel paths; and transmitting the forwarded network traffic based on the determination that the forwarded network traffic was received from at least the minimum number of the plurality of parallel paths.

2. The method as recited in claim 1, wherein the classification data comprises a virtual local area network (VLAN) tag.

3. The method as recited in claim 1, wherein the classification data comprises a multiprotocol label switching (MPLS) label.

4. The method as recited in claim 1, further comprising:
forwarding the tagged network traffic down each of the plurality of parallel paths if no threat is detected in the tagged network traffic as a result of the respective network security threat detection processing.

5. The method as recited in claim 4, further comprising:
receiving the tagged network traffic at a common end node of the parallel paths; and
forwarding the tagged network traffic if tagged the network traffic is received at the common node from a prescribed number of the parallel paths.

6. The method as recited in claim 5, wherein the prescribed number of parallel paths includes all of the parallel paths along which the network traffic was sent.

7. The method as recited in claim 5, wherein the prescribed number of parallel paths includes only a portion of the parallel paths along which the tagged network traffic was sent.

8. A system for detecting a network security threat, comprising:
a communication interface configured to receive network traffic; and
a processor configured to:
classify the received network traffic with a security risk related classification, the classification being determined at least in part by applying a threat detection heuristic to at least a portion of the network traffic;

tag the network traffic with classification data that indicates the security risk related classification into which the network traffic has been classified;

send the tagged network traffic, including the classification data, down each of a plurality of parallel paths, each path having associated with it one or more inline security measures configured to apply to the tagged network traffic one or more types of network security threat detection processing to an extent determined based at least in part on the classification data, wherein the same tagged network traffic is sent down each of the plurality of parallel paths;

process the tagged network traffic sent down each of the plurality of parallel paths according to the respective one or more inline security measures based at least in part on the classification data, wherein processing the tagged network traffic sent down each of the plurality of parallel paths comprises dropping the tagged network traffic if the tagged network traffic fails a security check and forwarding the tagged network traffic if the tagged network traffic passes the security check;

determining whether the forwarded network traffic was received from a minimum number of the plurality of parallel paths; and transmitting the forwarded network traffic based on the determination that the forwarded network traffic was received from at least the minimum number of the plurality of parallel paths.

9. A non-transitory computer readable storage medium having embodied thereon computer instructions which when executed by a computer cause the computer to perform a method comprising the steps of:

classifying network traffic with a security risk related classification, the classification being determined at least in part by applying a threat detection heuristic to at least a portion of the network traffic;

tagging the network traffic with classification data that indicates the security risk related classification into which the network traffic has been classified;

sending the tagged network traffic, including the classification data, down each of a plurality of parallel paths, each path having associated with it one or more inline security measures configured to apply to the tagged network traffic one or more types of network security threat detection processing to an extent determined based at least in part on the classification data, wherein the same tagged network traffic is sent down each of the plurality of parallel paths;

processing the tagged network traffic sent down each of the plurality of parallel paths according to the respective one or more inline security measures based at least in part on the classification data, wherein processing the tagged network traffic sent down each of the plurality of parallel paths comprises dropping the tagged network traffic if the tagged network traffic fails a security check and forwarding the tagged network traffic if the tagged network traffic passes the security check;

determining whether the forwarded network traffic was received from a minimum number of the plurality of parallel paths; and transmitting the forwarded network traffic based on the determination that the forwarded network traffic was received from at least the minimum number of the plurality of parallel paths.

* * * * *